US008885217B2

(12) United States Patent
Ohmiya

(10) Patent No.: US 8,885,217 B2
(45) Date of Patent: Nov. 11, 2014

(54) IMAGE FORMING APPARATUS IN WHICH A BOUNDARY BETWEEN PATCHES IN A FIXED PATTERN MATCHES WITH A BOUNDARY BETWEEN DIVIDED REGIONS

(71) Applicant: Satoshi Ohmiya, Kanagawa (JP)

(72) Inventor: Satoshi Ohmiya, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 56 days.

(21) Appl. No.: 13/727,967

(22) Filed: Dec. 27, 2012

(65) Prior Publication Data
US 2013/0169982 A1 Jul. 4, 2013

(30) Foreign Application Priority Data

Dec. 28, 2011 (JP) ................................ 2011-287216
Dec. 3, 2012 (JP) ................................ 2012-264620

(51) Int. Cl.
G06F 15/00 (2006.01)
G03F 3/08 (2006.01)
G03G 15/00 (2006.01)
G06K 15/02 (2006.01)
G03G 15/01 (2006.01)

(52) U.S. Cl.
CPC .............. *G06K 15/18* (2013.01); *G03G 15/556* (2013.01); *G03G 2215/0164* (2013.01); *G03G 2215/0129* (2013.01); *G03G 15/0189* (2013.01)
USPC ........................................... 358/1.9; 358/518

(58) Field of Classification Search
USPC ........................................... 358/1.9, 2.1, 518
See application file for complete search history.

(56) References Cited

U.S. PATENT DOCUMENTS

| 8,102,565 | B2 * | 1/2012 | Fan et al. ........................ 358/1.9 |
| 8,531,745 | B2 * | 9/2013 | Oki ............................... 358/521 |
| 2006/0140650 | A1 * | 6/2006 | Yokote ............................ 399/27 |
| 2007/0133016 | A1 | 6/2007 | Ohmiya | |
| 2007/0285716 | A1 | 12/2007 | Ohmiya | |
| 2010/0098443 | A1 * | 4/2010 | Oka ................................ 399/39 |
| 2011/0176157 | A1 * | 7/2011 | Katayama ...................... 358/1.9 |
| 2011/0228032 | A1 | 9/2011 | Ohmiya | |

FOREIGN PATENT DOCUMENTS

| JP | 2885680 | 2/1999 |
| JP | 2010-015018 | 1/2010 |
| JP | 2010-169793 | 8/2010 |

* cited by examiner

*Primary Examiner* — Barbara Reinier
(74) *Attorney, Agent, or Firm* — Oblon, Spivak, McClelland, Maier & Neustadt, L.L.P.

(57) ABSTRACT

An image forming apparatus includes an image data processing unit that converts combined data, in which image data to be used for adjusting image quality is inserted between pieces of print image data, into image forming data, and outputs the converted data; an image forming data counting unit that counts image forming pixels for each divided region obtained by dividing the image forming data in a sub-scanning direction; a storage unit that stores therein image forming data information relating to the image data to be used for adjusting image quality; and a control data generating unit that generates a control parameter for controlling image forming units based on count values of the image forming pixels. The control data generating unit generates the control parameters based on the image forming data information for a period in which the image data to be used for adjusting image quality is output.

8 Claims, 10 Drawing Sheets

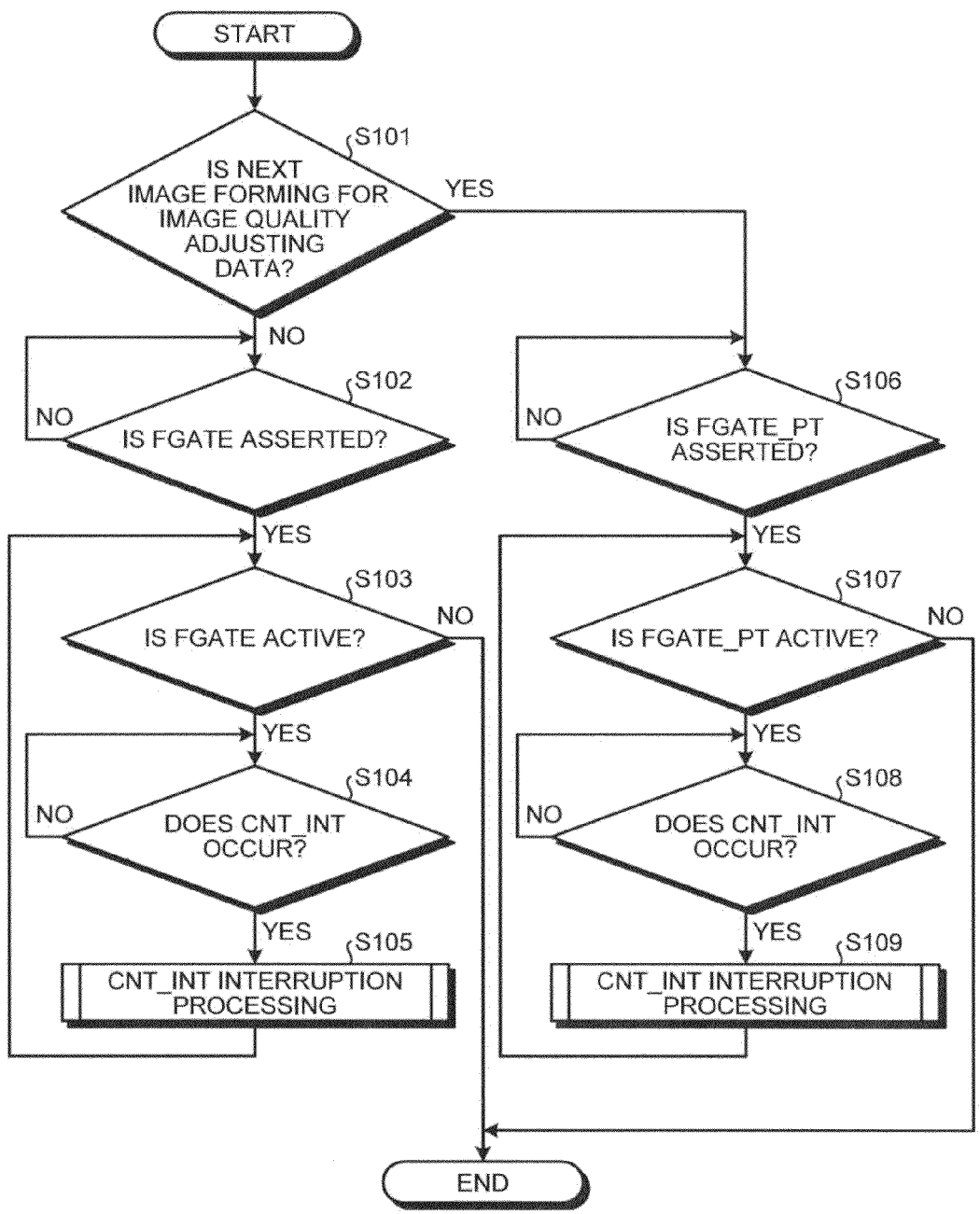

IMAGE FORMING APPARATUS IN WHICH A BOUNDARY BETWEEN PATCHES IN A FIXED PATTERN MATCHES WITH A BOUNDARY BETWEEN DIVIDED REGIONS

CROSS-REFERENCE TO RELATED APPLICATIONS

The present application claims priority to and incorporates by reference the entire contents of Japanese Patent Application No. 2011-287216 filed in Japan on Dec. 28, 2011 and Japanese Patent Application No. 2012-264620 filed in Japan on Dec. 3, 2012.

BACKGROUND OF THE INVENTION

1. Field of the Invention

The present invention relates to an image forming apparatus, and more particularly to an image forming apparatus for performing feed forward control.

2. Description of the Related Art

There has been already known a technique that counts pixels forming a toner image and performs feed forward control on the amount of replenished toner or the amounts of heat and pressure on fixing based on the count value (the number of pixels) in an image forming apparatus such as laser printer, facsimile, and digital copying machine. With the technique, conventionally a count value of print image data by one page of transfer sheet is acquired to perform feed forward control. Recently, in order to execute real-time control, the print image data by one page of transfer sheet is divided into fine regions, and a count value is acquired per divided region to perform feed forward control.

In this respect, Japanese Patent Application Laid-open No. 2010-015018 discloses an image forming apparatus that divides print image data by one page of transfer sheet into a plurality of blocks, and supplies a proper amount of toner to developing units based on density data calculated for each block.

However, when there is employed the structure in which the print image data by one page of transfer sheet is divided into fine regions to acquire count values, there is a problem that CPU calculation loads increase along with the short forward control loop.

Therefore, there is a need for a novel image forming apparatus capable of reducing CPU loads in the image forming apparatus that performs feed forward control at a high frequency.

SUMMARY OF THE INVENTION

According to an embodiment, there is provided an image forming apparatus as a tandem-type color image forming apparatus including a plurality of image forming units. The image forming apparatus includes an image data processing unit that converts combined data, in which image data to be used for adjusting image quality is inserted between pieces of print image data, into image forming data, and outputs the converted data; an image forming data counting unit that counts image forming pixels for each divided region obtained by dividing the image forming data at least in a sub-scanning direction; an image forming data information storage unit that stores therein image forming data information relating to the image data to be used for adjusting image quality; and a control data generating unit that generates a control parameter for controlling the image forming units based on count values of the image forming pixels counted by the image forming data counting unit. The control data generating unit is configured to generate the control parameter based on the image forming data information for a period in which the image data to be used for adjusting image quality is output.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating a flowchart of operation performed by an engine control unit according to the embodiment;

DETAILED DESCRIPTION OF THE PREFERRED EMBODIMENTS

Figure 1:
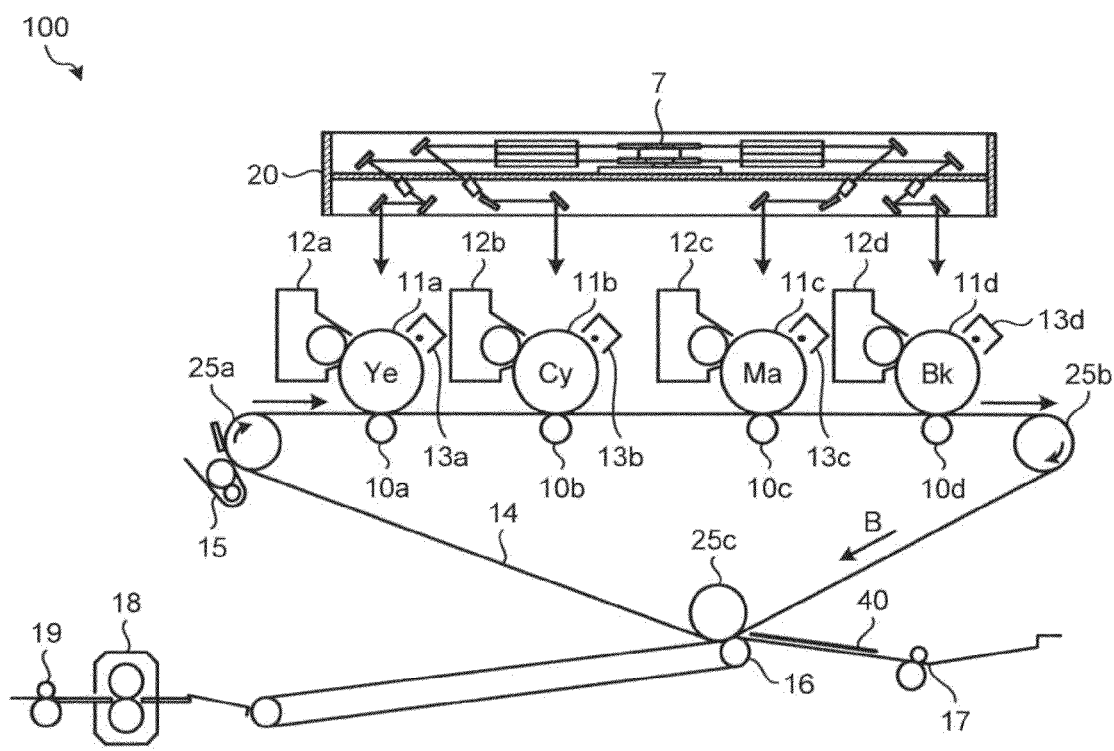
FIG. 1 is a diagram schematically illustrating a structure of image forming units in an image forming apparatus according to an embodiment of the present invention.

The present invention will be described below by way of an embodiment, but the present invention is not limited to the embodiment described later. In drawings referred to below, the same reference numerals are used for common elements and an explanation thereof will be omitted as needed.

FIG. 1 is a diagram schematically illustrating a structure of image forming units in an image forming apparatus 100 according to an embodiment of the present invention. As illustrated in FIG. 1, the image forming apparatus 100 referred to as a color tandem machine includes four photosensitive drums 11a to 11d, four charging units 12a to 12d, four toner cartridges 13a to 13d as developing units, four transfer rollers 10a to 10d, three intermediate transfer rollers 25a to 25c, an intermediate transfer belt 14, an intermediate transfer belt cleaning device 15, a transfer device 16, a paper feeding registration sensor 17, a fixing device 18, a discharging device 19 and an optical scanning device 20. In the image forming apparatus 100, a control unit (not illustrated) controls each component described above thereby to form an image on a transfer sheet. Its procedure will be specifically described below.

The optical scanning device 20 scans a beam timing-controlled by a polygon mirror 7 onto a photosensitive drums 11 in response to a job start signal thereby to form electrostatic latent images on the scanned faces of the photosensitive drums 11. The electrostatic latent images formed on the photosensitive drums 11 are developed by toners supplied from the toner cartridges 13a to 13d, and thereby a monochrome image is formed on each photosensitive drum 11.

In the example illustrated in FIG. 1, the yellow image which is formed by yellow (Ye) toner applied on the first photosensitive drum 11a is transferred onto the intermediate transfer belt 14 by the transfer roller 10a. The cyan image which is formed by cyan (Cy) toner applied on the subsequent photosensitive drum 11b is transferred onto the intermediate transfer belt 14 by the transfer roller 10b. The magenta image which is formed by magenta (Ma) toner applied on the subsequent photosensitive drum 11c is transferred onto the intermediate transfer belt 14 by the transfer roller 10c. The black image which is formed by black (Bk) toner applied to the subsequent photosensitive drum 11d is transferred onto the intermediate transfer belt 14 by the transfer roller 10d. Herein, the intermediate transfer belt 14 is conveyed with the intermediate transfer rollers 25a to 25c as drive rollers in the arrow B direction in the figure, and consequently the four toner images are overlapped (transferred) in the order of yellow, cyan, magenta and black thereby to form a combined color image on the intermediate transfer belt 14. The transfer device including the four transfer rollers 10a to 10d is referred to as a primary transfer device.

On the other hand, the image forming apparatus 100 separates and feeds transfer sheets 40 one by one from a feeding device in response to the job start signal. The image forming apparatus 100 temporarily stops feeding the sheets when the transfer sheet 40 is detected by the paper feeding registration sensor 17. Then, the image forming apparatus 100 rotates the registration roller to feed the transfer sheets 40 between the intermediate transfer belt 14 and the transfer device 16 in synchronization with a timing of conveying the combined color image formed on the intermediate transfer belt 14. In the transfer device 16, after the combined color image on the intermediate transfer belt 14 is transferred onto the transfer sheet 40, the transfer sheet 40 is fed to the fixing device 18. In the fixing device 18, heat and pressure are applied to the fed transfer sheet 40 and the combined color image is fixed on the transfer sheet 40. Finally, the transfer sheet 40 is discharged by the discharging roller attached to the discharging device 19 to be stacked on a discharge tray.

The outline of the procedure of forming an image on a transfer sheet by the image forming apparatus 100 according to the embodiment has been described above. The control unit configured to control image forming in the image forming apparatus 100 will be described below with reference to FIG. 2. FIG. 1 will be seen as needed in the following description.

Figure 2:
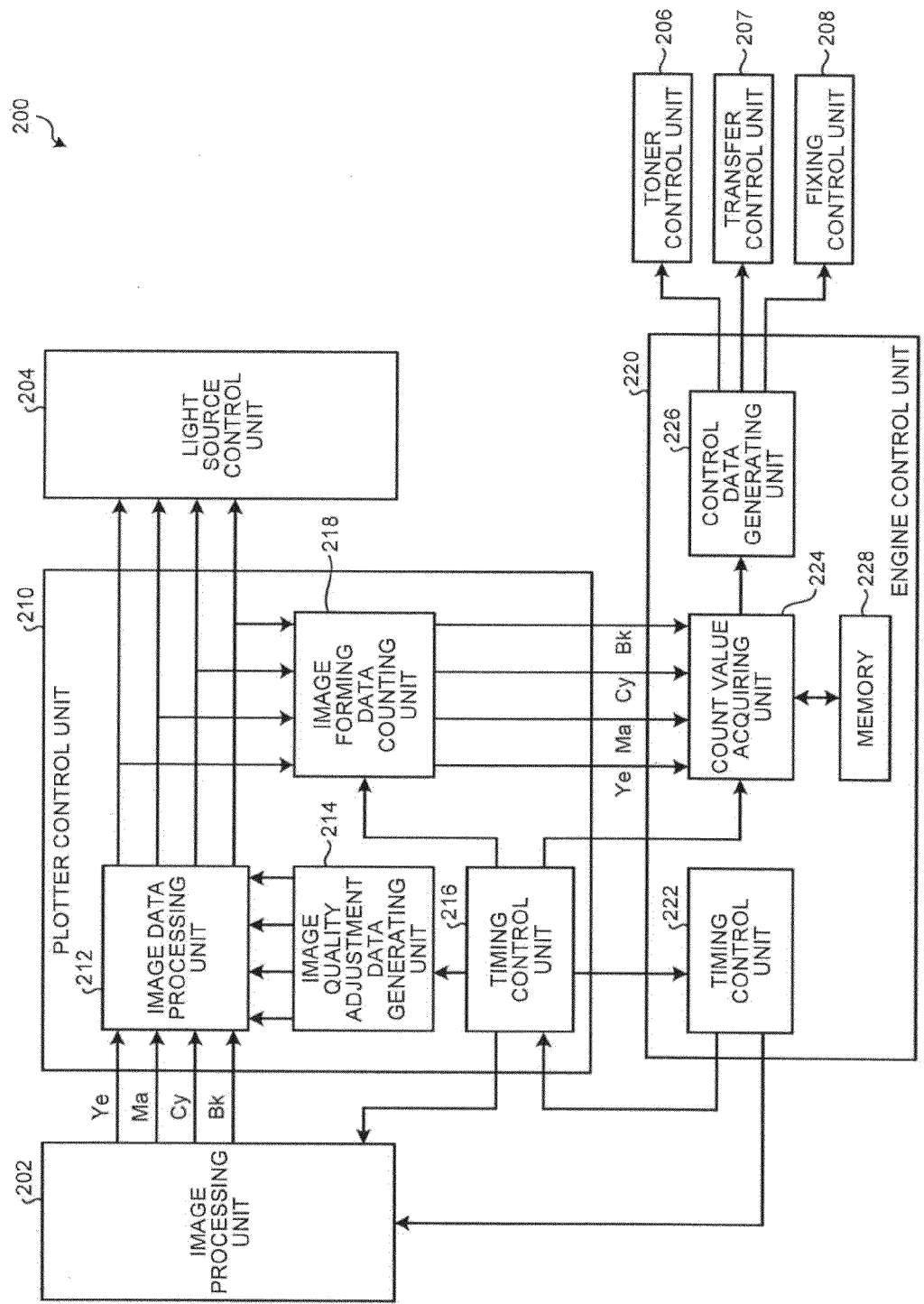
FIG. 2 is a functional block diagram of a control unit provided in the image forming apparatus according to the embodiment.

FIG. 2 illustrates a functional block diagram of a control unit 200 provided in the image forming apparatus 100 according to the embodiment. As illustrated in FIG. 2, the control unit 200 includes an image processing unit 202, a plotter control unit 210, a light source control unit 204, an engine control unit 220, a toner control unit 206, a transfer control unit 207 and a fixing control unit 208.

The image processing unit 202 performs a predetermined image processing on image data to be printed (scan data or image file transferred from an external host) thereby to generate image data with the four colors of yellow (Ye), magenta (Ma), cyan (Cy) and black (Bk) (which will be referred to as print image data) and to output the same to the plotter control unit 210.

The plotter control unit 210 includes an image data processing unit 212, an image quality adjustment data generating unit 214, a timing control unit 216, and an image forming data counting unit 218.

The image quality adjustment data generating unit 214 generates predetermined image forming data to be used for adjusting the image quality (referred to as image quality adjustment data) such as density adjustment pattern or color matching adjustment pattern, and outputs the same to the image data processing unit 212. The image quality adjustment data will be described later in detail.

The image data processing unit 212 combines the print image data input from the image processing unit 202 and the image quality adjustment data input from the image quality adjustment data generating unit 214. The image data processing unit 212 converts the combined data in which the image quality adjustment data is inserted between two pieces of print image data, each of which is data of one page, into image forming data to be output to the light source control unit 204. The light source control unit 204 controls ON/OFF of the light source of the optical scanning device 20 based on the input image forming data to expose the photosensitive drums 11a to 11d. At the same time, the image data processing unit 212 outputs the image forming data to the image forming data counting unit 218.

The timing control unit 216 controls operation timings of the entire plotter control unit 210. For example, the timing control unit 216 controls, based on an image forming start signal input from the engine control unit 220, a timing when the image processing unit 202 transfers the image data to the image data processing unit 212, a timing when the image data processing unit 212 processes the image data, a timing when the image quality adjustment data generating unit 214 generates the image quality adjustment data, and the like.

Specifically, the timing control unit 216 outputs a FGATE signal, a FGATE_PT signal and a CNT_INT signal to the image forming data counting unit 218. Herein, the CNT_INT signal is output also to the engine control unit 220 described later. Each timing signal will be described later in detail.

The image forming data counting unit 218 counts pixels forming the toner image (which will be referred to as image forming pixels) based on the image forming data input from the image data processing unit 212. The image forming data counting unit 218 distinguishes between image forming data consisting of the print image data and image forming data consisting of the image quality adjustment data based on the FGATE signal and the FGATE_PT signal input from the timing control unit 216, and counts the image forming pixels of the image forming data consisting of the print image data as well as the image forming pixels of the image forming data consisting of the image quality adjustment data.

In stead of acquiring, as a count value, the number of pixels in whish tone values are present, the image forming data counting unit 218 may acquire, as a count value, a accumulated value obtained by accumulating tone values of the respective pixels, based on whether a tone value is present in each pixel.

The image forming data counting unit 218 stores a count value (accumulated value) at a point of time as a count value of the divided region in response to an input CNT_INT signal. The divided regions will be described later in detail.

The engine control unit 220 includes a timing control unit 222, a count value acquiring unit 224, a control data generating unit 226 and a memory 228.

The timing control unit 222 outputs the operation timing signals to various processing units such as the image processing unit 202 and the plotter control unit 210 as described above.

The count value acquiring unit 224 is input with the CNT_INT signal as a timing signal for reading the count value from the timing control unit 216 in the plotter control unit 210. The count value acquiring unit 224 reads and acquires the count value stored in the image forming data counting unit 218 in the plotter control unit 210 in response to the input CNT_INT signal.

The control data generating unit 226 makes a predetermined calculation based on the count value acquired by the count value acquiring unit 224 and generates various control parameters used for toner replenishment control or fixing control (heat control and pressure control). Specifically, the control data generating unit 226 calculates an image area rate of the divided region from the count value of the divided region acquired by the count value acquiring unit 224. Herein, the image area rate is a rate of the image forming pixels relative to all the pixels configuring the region (divided region in this case) having a predetermined area. The control data generating unit 226 generates various control parameters such as a control parameter for controlling the amount of replenished toner necessary for image forming in a corresponding divided region, a control parameter for controlling the amount of heat or the amount of pressure of the fixing device 18, and a control parameter for controlling a transfer current in the transfer units (primary and secondary transfer devices). The engine control unit 220 uses the various control parameters generated by the control data generating unit 226 to control various control modules such as the toner control unit 206, the transfer control unit 207 and the fixing control unit 208.

The divided regions described above will be described herein. In the embodiment, the image forming data counting unit 218 divides the image forming data of one page in a proper unit, acquires count values of the image forming pixels per divided data unit and provides the count values to the engine control unit 220, instead of acquiring a count value of the image forming pixels of the image forming data by one page. The engine control unit 220 generates control parameters based on the count values acquired per data unit, thereby achieving highly precise control. The divided area according to the embodiment is a concept for defining such a data unit.

Figure 3:
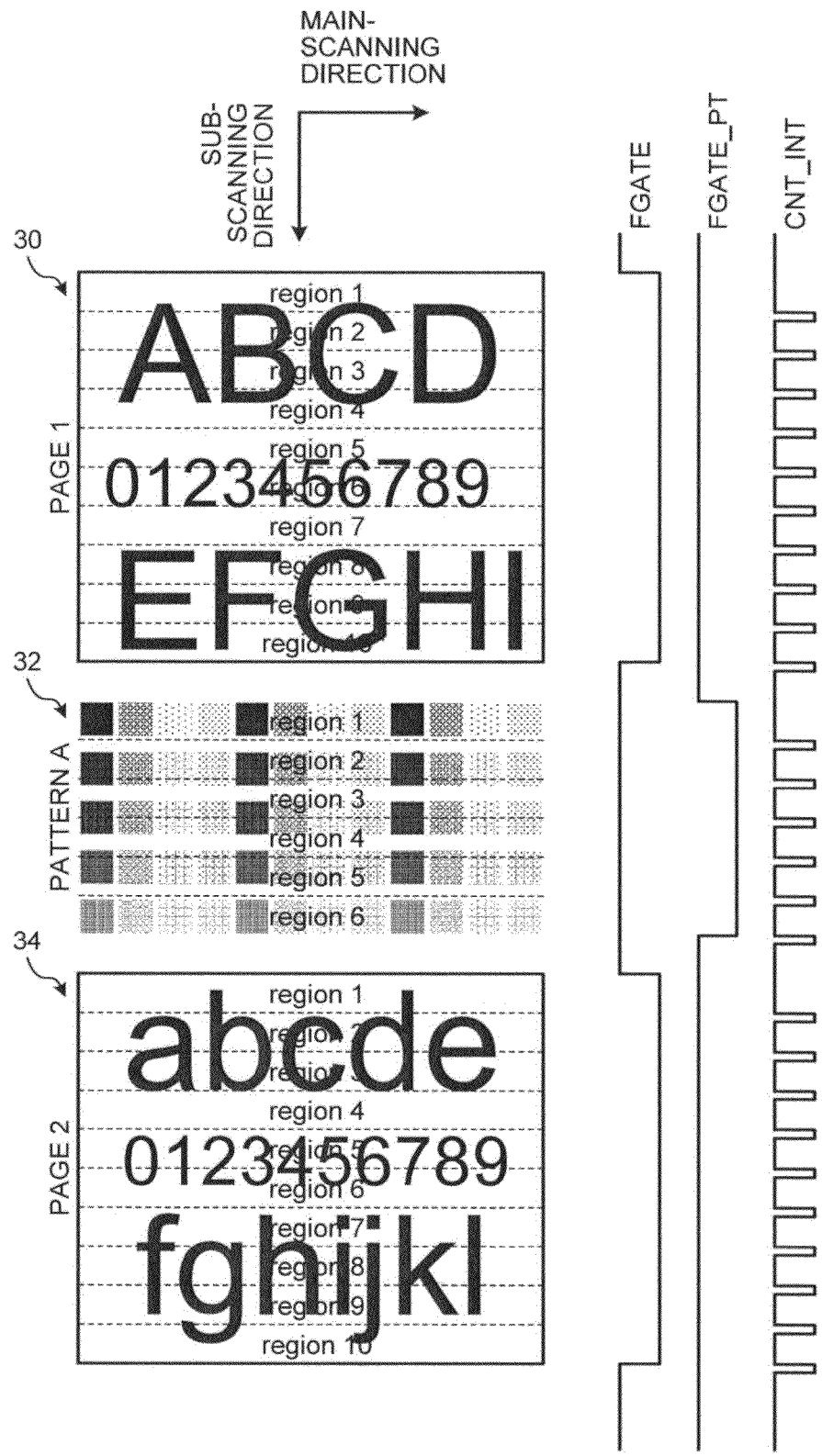
FIG. 3 is a diagram illustrating image forming data input into an image forming data counting unit according to the embodiment together with a timing chart.
Figure 4:
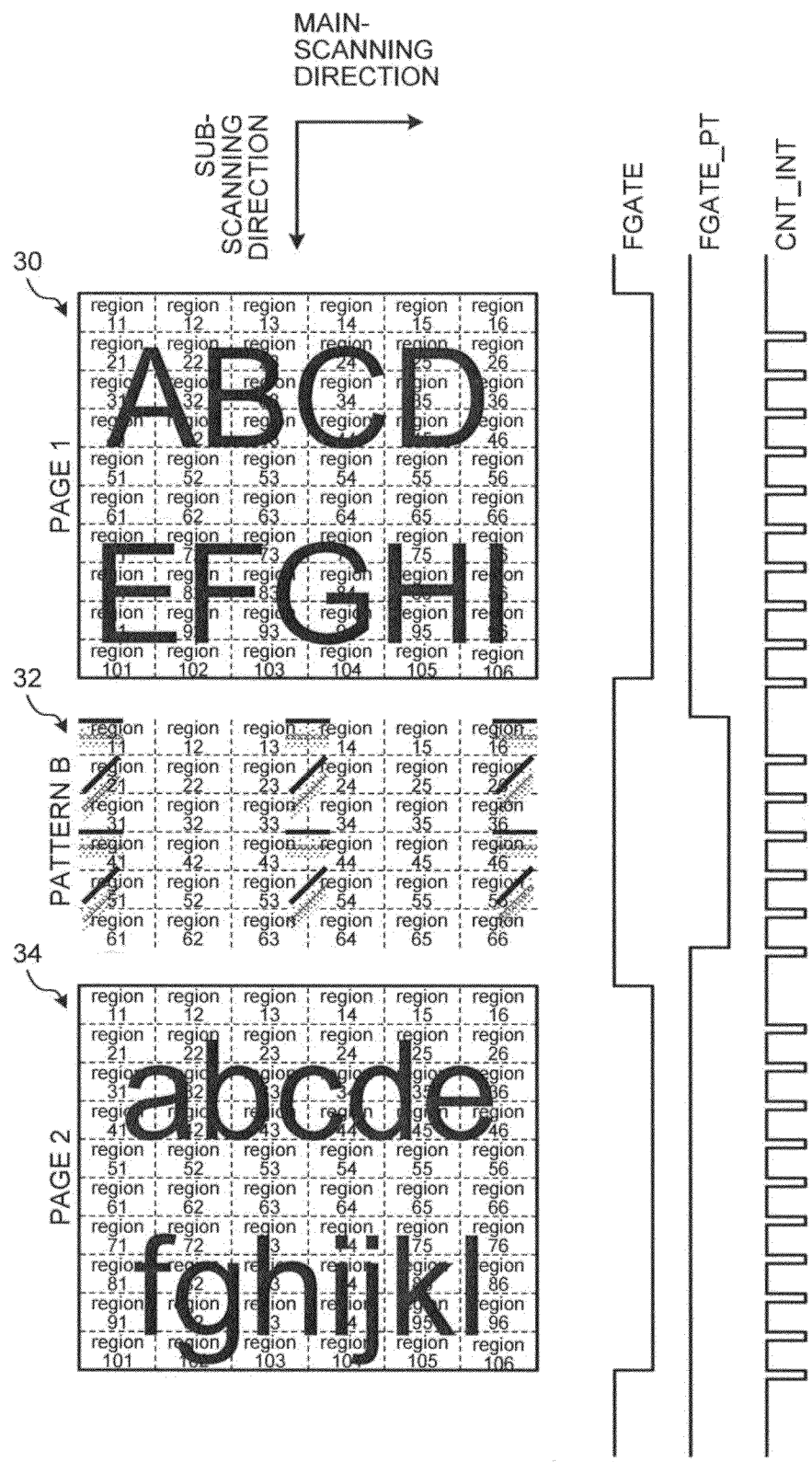
FIG. 4 is a diagram illustrating image forming data input into the image forming data counting unit according to the embodiment together with a timing chart.

FIG. 3 illustrates data combined in the image data processing unit 212 together with a timing chart of various timing signals (similar as in FIG. 4). In the example illustrated in FIG. 3, the image quality adjustment data 32 (density adjustment pattern in this case) is inserted between two pieces of print image data 30 and 34, each of which is data of one page. In the timing chart of FIG. 3, the FGATE signal is a timing signal when an image is formed on a transfer sheet. The timing control unit 216 asserts the FGATE signal at a timing when image forming is started, and negates the FGATE signal at a timing when the image forming is completed.

In the example illustrated in FIG. 3, each piece of the print image data 30, 34, each of which is data of one page, is divided into 10 divided regions (region 1 to region 10) in the sub-scanning direction, and the image quality adjustment data 32 is divided into six divided regions (region 1 to region 6) in the sub-scanning direction. The timing control unit 216 activates the CNT_INT interruption signal at a timing when counting (accumulating) the image forming pixels in each divided region is completed.

The image forming data counting unit 218 starts counting the image forming pixels of the image forming data consisting of the print image data to be input in response to the asserted FGATE signal indicating the start of the image forming. The count value acquiring unit 224 in the engine control unit 220 reads the count value acquired for region 1 from the image forming data counting unit 218 in response to activation of the first CNT_INT interruption signal. When the control data generating unit 226 generates control parameters based on the count value for region 1, the interruption processing terminates and the timing control unit 216 negates the CNT_INT signal.

Subsequently, the count value acquiring unit 224 in the engine control unit 220 acquires the count value of region 2 from the image forming data counting unit 218 in response to re-activation of the second CNT_INT interruption signal. When the control data generating unit 226 generates control parameters based on the count value of area 2, the timing control unit 216 negates the CNT_INT signal. Subsequently, the same processing is repeatedly performed each time the CNT_INT signal is activated. Thereafter, the final CNT_INT interruption signal is activated in synchronization with the negated FGATE signal indicating that image formation of one page is completed, and the count value acquiring unit 224 in the engine control unit 220 acquires the count value of region 10 from the image forming data counting unit 218, and the control data generating unit 226 generates control parameters based on the count value of area 10.

The FGATE_PT signal is a timing signal for generating the image quality adjustment data. The timing control unit 216 asserts the FGATE_PT signal at a timing when the image quality adjustment data 32 starts to be generated, and negates the FGATE_PT signal at a timing when the generation of the image quality adjustment data 32 is completed. The timing control unit 216 activates the CNT_INT interruption signal at a timing when the count value of each divided region among region 1 to region 6 in the image quality adjustment data 32 is read, and the engine control unit 220 performs an interruption operation in response to the CNT_PT signal.

FIG. 3 exemplifies the structure of dividing the image forming data in the sub-scanning direction, but the image forming data may be divided in the sub-scanning direction and the main-scanning direction as illustrated in FIG. 4 according to the embodiment. In the image forming data, the image forming pixels may be localized in the main-scanning direction. For example, in image forming data by which black characters are formed on the right side of the transfer sheet and a color image is formed on the left side of the transfer sheet, the image forming pixels of the image colors (Ye, Cy, Ma) are localized on the left side in the main-scanning direction. Thus, a tilt in the amount of consumed toner of the image colors (Ye, Cy, Ma) occurs in the main-scanning direction. If such documents are continuously output, the amount of toner in the color developing units is non-uniform in the main-scanning direction.

In this viewpoint, as illustrated in FIG. 4, if the image forming data is divided in the sub-scanning direction and the main-scanning direction and a count value is acquired for each divided region, the amount of toner can be prevented from being non-uniform in the main-scanning direction.

Herein, in a conventional color tandem machine (image forming apparatus), the engine control unit reads a count value of a divided region from the plotter control unit in the interruption processing performed in response to the CNT_INT signal by which the count value of each divided region of the image quality adjustment data is acquired. However, in the conventional structure, there is a problem that CPU loads increase. This problematic point will be described with reference to FIG. 5.

Figure 5:
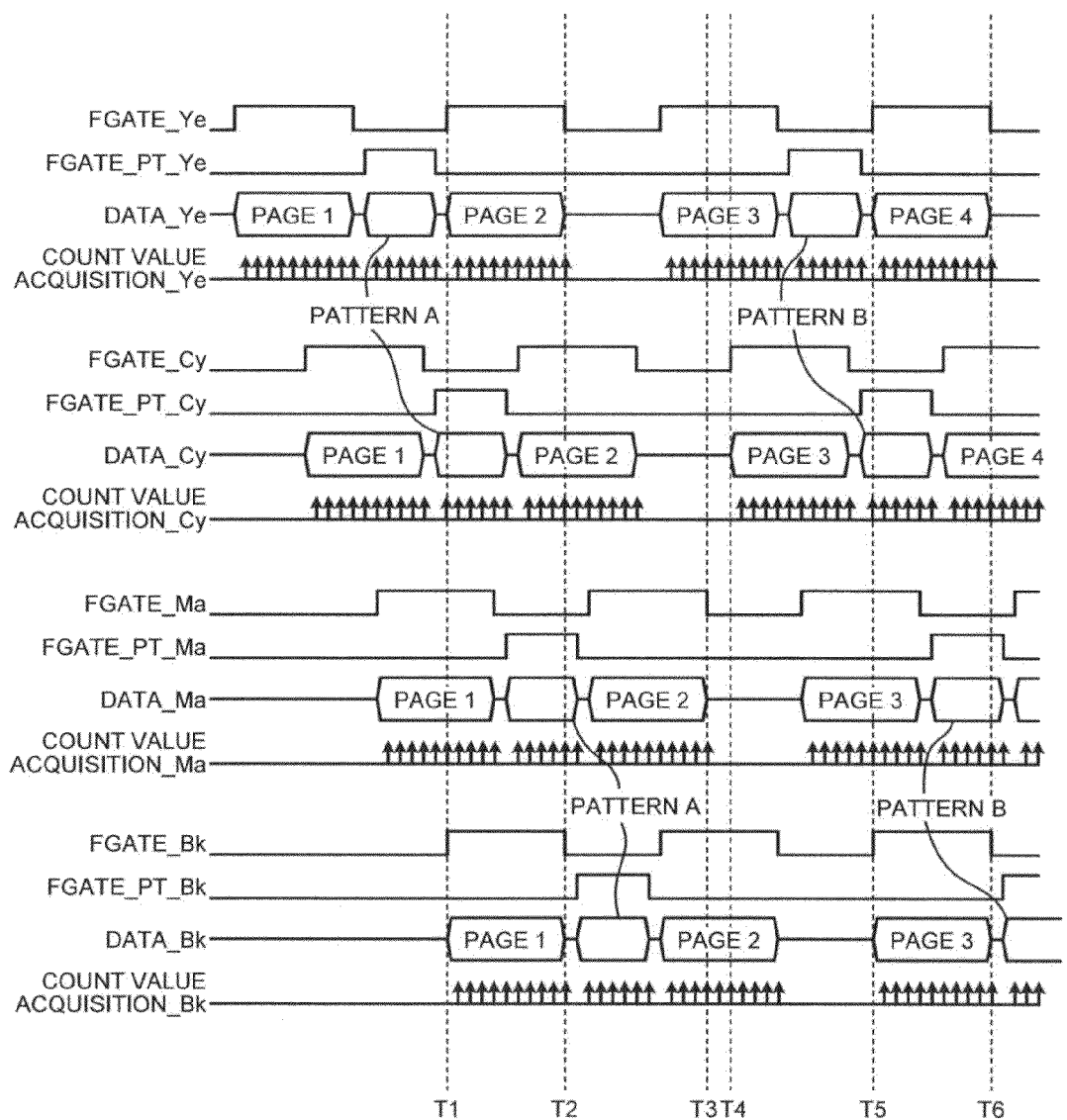
FIG. 5 is a diagram illustrating a timing chart of operation of acquiring count values of image forming data in a conventional apparatus.

FIG. 5 is a timing chart of operation of acquiring count values of image forming data in the conventional apparatus. FIG. 5 illustrates a timing chart for yellow (Ye), cyan (Cy), magenta (Ma) and black (Bk) in this order from the top of the sheet. FIG. 5 exemplifies a case in which a pattern A as image quality adjustment data is output between image forming data of page 1 and image forming data of page 2, and a pattern B is output between image forming data of page 3 and image forming data of page 4 (similar as in FIG. 10).

In the color tandem machine, the photosensitive drums for the colors of Ye, Cy, Ma and Bk are arranged to be separated in the sub-scanning direction, and thus the timings for forming the respective colors' images are shifted by a predetermined time. In other words, as illustrated in FIG. 5, after a predetermined time since the first image forming color Ye starts forming an image of page 1, the second image forming color Cy starts forming an image of page 1, and similarly, after a predetermined time, the third image forming color Ma and the fourth image forming color Bk start forming an image in page 1 in this order.

Herein, the arrows in FIG. 5 indicate a timing when the engine control unit reads a count value of each region from the plotter control unit. As illustrated in FIG. 5, the engine control unit reads the count values of three colors from the plotter control unit at the same time in the period from timing (T2) to timing (T3) and in the period from timing (T4) to timing (T5). The engine control unit reads the count values of two colors from the plotter control unit at the same time in the period from timing (T3) to timing (T4).

On the other hand, in terms of the period from timing (T1) to timing (T2) and the period from timing (T5) to timing (T6), the engine control unit reads the count values of the four colors from the plotter control unit in the periods. That is, the CPU calculation loads increase in the periods.

The embodiment employs the following structure against the problem in the conventional apparatus. That is, the memory 228 functioning as an image forming data information storage unit is provided inside the engine control unit 220 (see FIG. 2). A memory that stores image forming data information may be provided outside the engine control unit 220 and the engine control unit 220 may read the image forming data information from the memory.

Figure 6A:
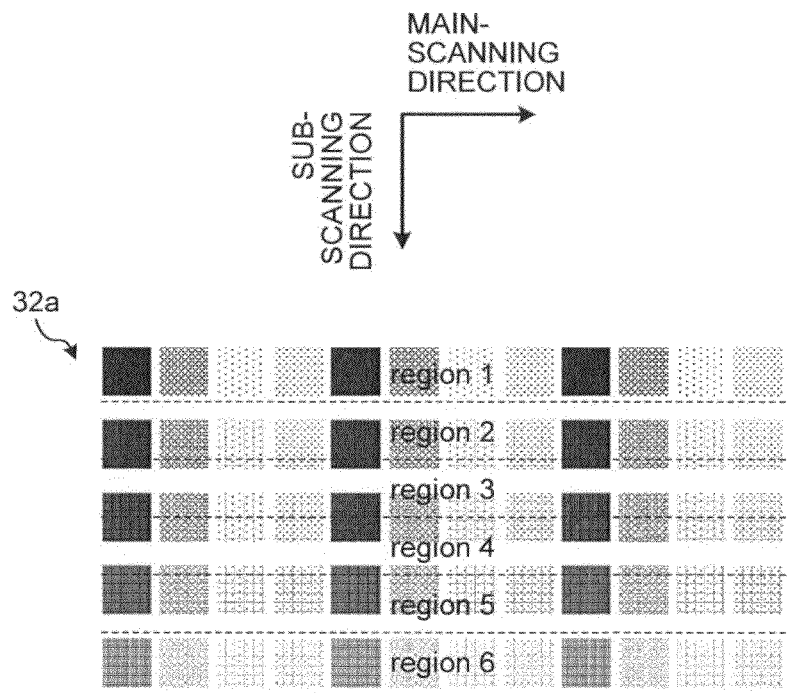
FIGS. 6A and 6B are diagrams illustrating image quality adjustment data.
Figure 6B:
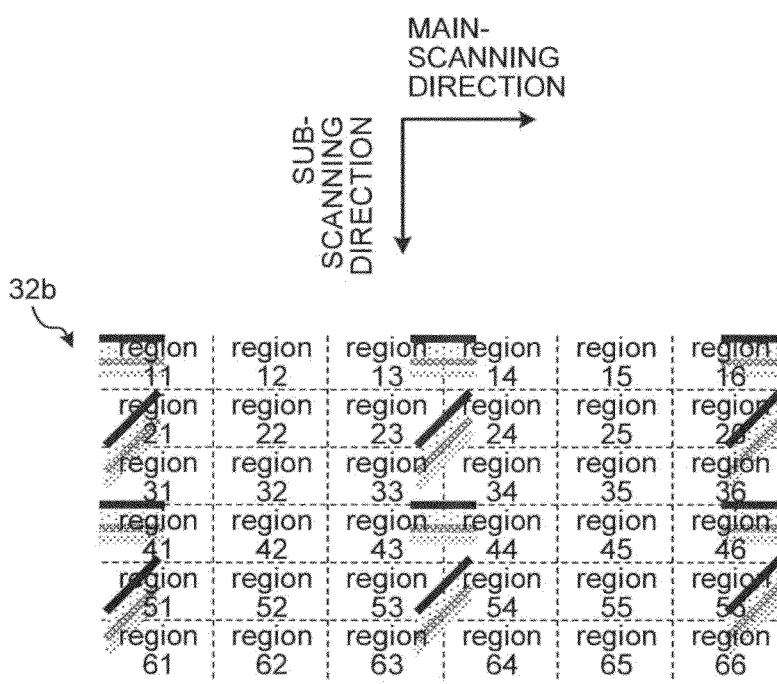

The image quality adjustment data may assume a density adjustment pattern 32a illustrated in FIG. 6A or a color matching adjustment pattern 32b illustrated in FIG. 6B. The image quality adjustment data is a fixed pattern, and thus the number of image forming pixels thereof can be determined in advance. In terms of the point, in the embodiment, the number of image forming pixels of each divided region of the image quality adjustment data is determined in advance, and the number of image forming pixels is stored as image forming data information in the memory 228.

Herein, in the example illustrated in FIGS. 6A and 6B, in the density adjustment pattern 32a and the color matching adjustment pattern 32b, a boundary between patches and a boundary of divided regions do not match. In this case, the count value of each region needs to be counted based on a patch shape different per region, and thus a complicated calculation is required.

Figure 7A:
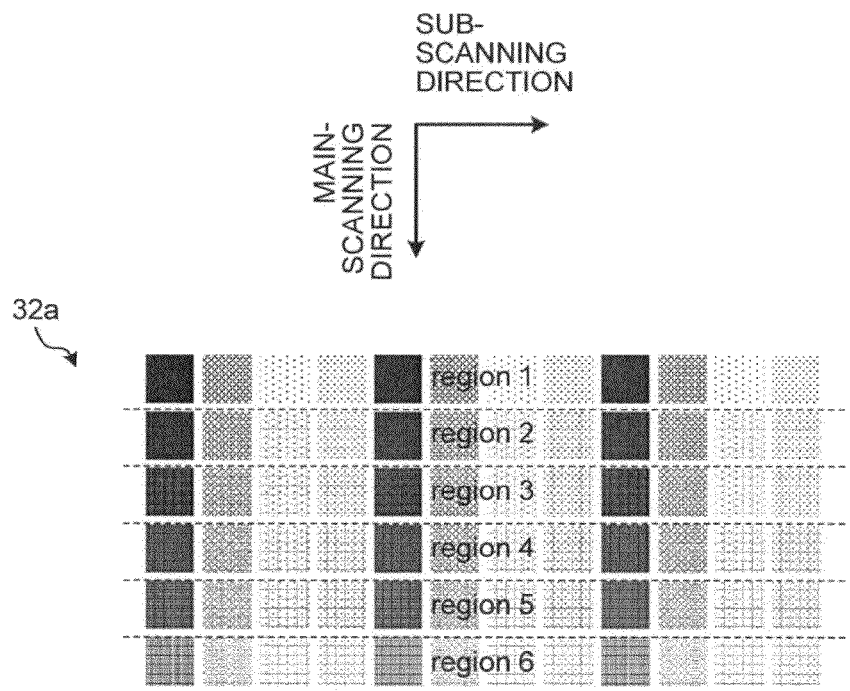
FIGS. 7A and 7B are diagrams illustrating image quality adjustment data.
Figure 7B:
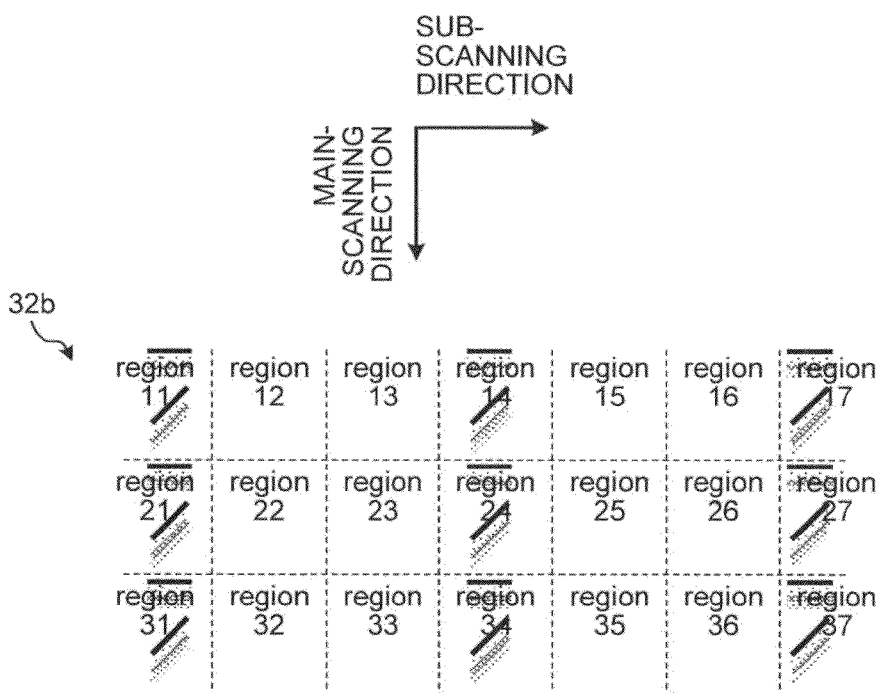

In contrast, as illustrated in FIGS. 7A and 7B, if a size of the divided region is defined such that the boundary between divided regions matches with the boundary between patches in the density adjustment pattern 32a or the boundary between patches in the color matching adjustment pattern 32b, the calculation for counting the count value of each region can be simplified.

Returning to FIG. 5, it can be seen that the period in which the engine control unit reads the count values of the four colors from the plotter control unit at the same time is in the period in which any image forming system of each color outputs the image quality adjustment data. In terms of the point, the embodiment employs a structure in which the previously-stored count values of the image quality adjustment data are read from the memory 228 provided inside the engine control unit 220, instead of reading the count values from the plotter control unit 210, in the period in which the image quality adjustment data is output, thereby avoiding a situation where the CPU calculation loads increase. The operation performed by the engine control unit 220 according to the embodiment will be described with reference to FIG. 8.

FIG. 8 is a flowchart of operation performed by the engine control unit 220 according to the embodiment. At first, in step S101, the engine control unit 220 determines whether or not the next image forming operation is for image quality adjustment data. When it is determined that the next image forming operation is not for image quality adjustment data (step S101, No), the process flow proceeds to step S102, where the engine control unit 220 waits for FGATE to be asserted (step S102, No). When FGATE is asserted (step S102, Yes), the process flow proceeds to step S103, where the engine control unit 220 determines whether FGATE is active.

When FGATE is active (step S103, Yes), the engine control unit 220 determines that an image is being formed, and proceeds to step S104 to monitor an occurrence of a CNT_INT signal (step S104, No). When the CNT_INT signal is detected (step S104, Yes), the process flow proceeds to step S105, where the engine control unit 220 performs a CNT_INT interruption operation. Thereafter, the process flow returns to step S103. While FGATE is being active, the engine control unit 220 repeats the operations in step S103 to step S105. Thereafter, when the image forming is completed and FGATE is negated (step S103, No), the engine control unit 220 terminates the operations.

On the other hand, when it is determined in step S101 that the next image forming operation is for image quality adjustment data (step S101, Yes), the process flow proceeds to step S106, where the engine control unit 220 waits FGATE_PT to be asserted (step S106, No). When FGATE_PT is asserted (step S106, Yes), the process flow proceeds to step S107, where the engine control unit 220 determines whether FGATE_PT is active.

When FGATE_PT is active (step S107, Yes), the engine control unit 220 determines that an image is being formed, and proceeds to step S108 to monitor an occurrence of the CNT_INT signal (step S108, No). When the CNT_INT signal is detected (step S108, Yes), the process flow proceeds to step S109, where the engine control unit 220 performs the CNT_INT interruption operation. Thereafter, the process flow returns to step S107. While FGATE_PT is being active, the engine control unit 220 repeats the operations in step S107 to step S109. Thereafter, when the image forming is completed and FGATE_PT is negated (step S107, No), the engine control unit 220 terminates the operations. The CNT_INT interruption operations in step S105 and step S109 described above will be described below with reference to FIG. 9.

Figure 9:
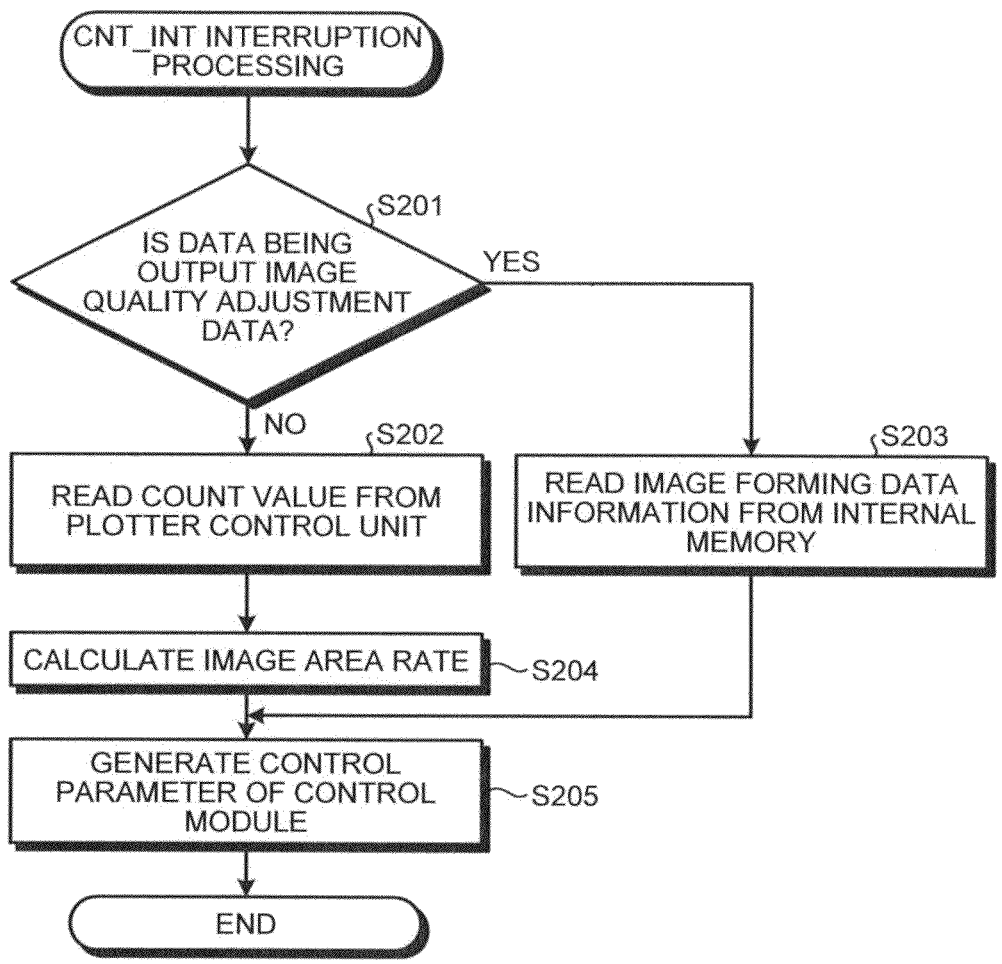
FIG. 9 is a diagram illustrating a flowchart of a CNT_INT interruption operation according to the embodiment.

FIG. 9 illustrates a flowchart of the CNT_INT interruption operation. At first, in step S201, the engine control unit 220 determines whether or not the data being output is image quality adjustment data. When it is determined that the data is not image quality adjustment data (step S201, No), the process flow proceeds to step S202. In step S202, the count value acquiring unit 224 in the engine control unit 220 performs operation of reading the count values from the image forming data counting unit 218 in the plotter control unit 210. When reading the count values is completed, the process flow proceeds to step S204. In step S204, the control data generating unit 226 in the engine control unit 220 calculates an image area rate based on the count values read from the image forming data counting unit 218. Thereafter, in subsequent step S205, the control data generating unit 226 generates various control parameters used in the control modules (such as the toner control unit 206 and the fixing control unit 208) based on the calculated image area rate, and terminates the interruption operation.

On the other hand, when it is determined in step S201 that the data being output is image quality adjustment data (step S201, Yes), the process flow proceeds to step S203. In step S203, the count value acquiring unit 224 in the engine control unit 220 performs operation of reading image forming data information (the number of image forming pixels) of the image quality adjustment data being output from the memory 228. When reading the number of image forming pixels completes, the process flow proceeds to step S204. In step S204, the control data generating unit 226 in the engine control unit 220 calculates an image area rate based on the number of image forming pixels read from the memory 228. Thereafter, in subsequent step S205, the control data generating unit 226 generates various control parameters used in the control modules (such as the toner control unit 206 and the fixing control unit 208) based on the calculated image area rate, and terminates the interruption operation.

As another example, an image area rate may be calculated in advance based on the number of image forming pixels of each divided region of the image quality adjustment data, and the image area rate may be stored as image forming data information in the memory 228. In this case, in step S203, the count value acquiring unit 224 in the engine control unit 220 performs operation of reading the image area rate of the image quality adjustment data being output from the memory 228, and proceeds to step S205. In step S205, the control data generating unit 226 in the engine control unit 220 generates various control parameters based on the image area rate read from the memory 228. According to this example, the calculation of the image area rate of the image quality adjustment data may be omitted.

As described above, according to the embodiment, the count value acquiring unit 224 in the engine control unit 220 does not need to read the count values from the image forming data counting unit 218 in the plotter control unit 210 in the period when the image quality adjustment data is output, and thus the CPU loads are reduced. This point will be specifically described with reference to FIG. 10.

Figure 10:
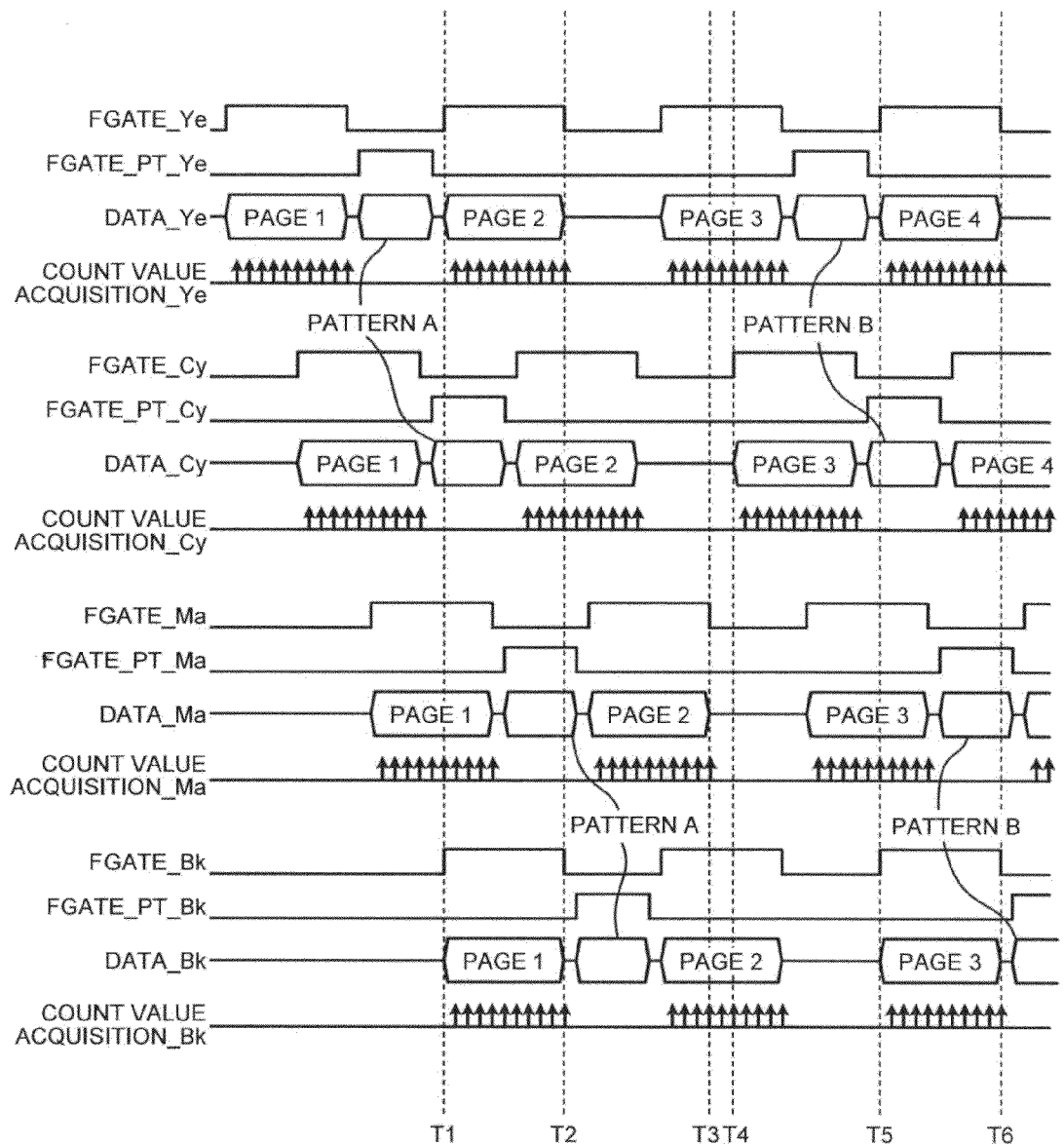
FIG. 10 is a diagram illustrating a timing chart of operation of acquiring count values of image forming data according to the embodiment.

FIG. 10 illustrates a timing chart of operation of acquiring the count values of the image forming data in the image forming apparatus 100 according to the embodiment. The arrows in the figure indicate a timing when the count value acquiring unit 224 in the engine control unit 220 reads a count value for each region from the image forming data counting unit 218.

As illustrated in FIG. 10, in the embodiment, the count value acquiring unit 224 in the engine control unit 220 does not read a count value from the image forming data counting unit 218 in the plotter control unit 210 in the periods where image quality adjustment data A and image quality adjustment data B are output. In this case, the count value acquiring unit 224 in the engine control unit 220 reads the count values of three colors from the image forming data counting unit 218 at the same time in the period from timing (T2) to timing (T3) and in the period from timing (T4) to timing (T5), and reads the count values of two colors from the image forming data counting unit 218 at the same time in the period from timing (T3) to timing (T4). This point is the same as the related art.

In the period from timing (T1) to timing (T2) and the period from timing (T5) to timing (T6), it can be seen that the count value acquiring unit 224 reads the count values of three colors from the image forming data counting unit 218 at the same time. That is, according to the embodiment, the engine control unit 220 does not read a count value from the plotter control unit 210 in the period when the image quality adjustment data is output. Thus, the number of image forming systems for which the engine control unit 220 has to perform the read processing at the same time decreases from four colors to three colors, and thus the CPU loads surely decrease.

The present invention has been described above by way of the embodiment, but the present invention is not limited to the above embodiment, and any embodiment capable of obtaining the operations and effects of the present invention may be encompassed in the range envisioned by those skilled in the art and the scope of the present invention.

Each function of the above embodiment can be realized in a device-executable program described in an object-oriented programming language such as C, C++, C# and Java (trademark), and the program according to the embodiment may be stored in a device-readable recording medium such as hard disk device, CD-ROM, MO, DVD, flexible disk, EEPROM and EPROM to be distributed, or may be transmitted via a network in a possible form by other apparatuses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus including a plurality of image forming units, comprising:
    an image data processing unit that converts combined data, in which image data to be used for adjusting image quality is inserted between pieces of print image data, into image forming data, and outputs the converted data;
    an image forming data counting unit that counts image forming pixels for each divided region obtained by dividing the image forming data at least in a sub-scanning direction;
    an image forming data information storage unit that stores therein image forming data information relating to the image data to be used for adjusting image quality; and
    a control data generating unit that generates a control parameter for controlling the image forming units based on count values of the image forming pixels counted by the image forming data counting unit,
    wherein:
    the control data generating unit is configured to generate the control parameter based on the image forming data information for a period in which the image data to be used for adjusting image quality is output,
    the image data to be used for adjusting image quality is a fixed pattern selected from a density adjustment pattern and a color mismatching adjustment pattern, and
    a boundary between patches in the fixed pattern matches with a boundary between the divided regions.

2. The image forming apparatus according to claim 1, wherein
    the image forming data information is the number of image forming pixels in the image data to be used for adjusting image quality, and the control data generating unit calculates an image area rate based on the number of image forming pixels, and generates the control parameter based on the image area rate.

3. The image forming apparatus according to claim 1, wherein
the image forming data information is an image area rate in the image data to be used for adjusting image quality, and
the control data generating unit generates the control parameter based on the image area rate.

4. The image forming apparatus according to claim 1, wherein the divided regions are obtained by dividing the image forming data in the sub-scanning direction and a main-scanning direction.

5. The image forming apparatus according to claim 1, wherein image forming data information relating to the image data to be used for adjusting image quality is defined for each divided region obtained by dividing the image forming data of the image data to be used for adjusting image quality at least in the sub-scanning direction.

6. The image forming apparatus according to claim 1, wherein the control data generating unit generates a control parameter for controlling an amount of replenished toner to a toner supplying unit that supplies toner for developing an electrostatic latent image formed on a photoreceptor.

7. The image forming apparatus according to claim 1, wherein the control data generating unit generates a control parameter for controlling at least one of an amount of heat and an amount of pressure in a fixing unit that fixes a color image transferred onto a transfer sheet.

8. The image forming apparatus according to claim 1, wherein the control data generating unit generates a control parameter for controlling a transfer current of a transfer unit.

* * * * *